US012270244B2

(12) United States Patent
Flannery et al.

(10) Patent No.: US 12,270,244 B2
(45) Date of Patent: Apr. 8, 2025

(54) PUSH AND SLIDE GATE HANDLE

(71) Applicant: Regalo International, LLC, Burnsville, MN (US)

(72) Inventors: Mark A. Flannery, Longboat Key, FL (US); Gary T. Schultze, Savage, MN (US); Nicholas E. Beattie, Saint Paul, MN (US); Timothy C. Daggy, Shakopee, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

(21) Appl. No.: 18/380,188

(22) Filed: Oct. 15, 2023

(65) Prior Publication Data

US 2024/0052701 A1 Feb. 15, 2024

Related U.S. Application Data

(63) Continuation of application No. 17/019,178, filed on Sep. 11, 2020, now Pat. No. 11,788,350, which is a (Continued)

(51) Int. Cl.

| | |
|---|---|
| ***E06B 11/02*** | (2006.01) |
| ***E05B 65/00*** | (2006.01) |
| ***E06B 3/36*** | (2006.01) |
| ***E06B 9/04*** | (2006.01) |
| *E05B 15/10* | (2006.01) |

(Continued)

(52) U.S. Cl.

CPC .......... *E06B 11/02* (2013.01); *E05B 65/0014* (2013.01); *E06B 3/36* (2013.01); *E06B 9/04* (2013.01); *E06B 11/026* (2013.01); *E05B 15/101* (2013.01); *E05B 17/2019* (2013.01); *E05B 65/0007* (2013.01); *E05C 1/04* (2013.01); *E06B 2009/002* (2013.01)

(58) Field of Classification Search

None

See application file for complete search history.

(56) References Cited

U.S. PATENT DOCUMENTS

| | | |
|---|---|---|
| D395,622 S | 6/1998 | Flannery |
| 5,890,320 A | 4/1999 | Andersen |

(Continued)

FOREIGN PATENT DOCUMENTS

| | | |
|---|---|---|
| DE | 20000388 U1 | 4/2000 |
| GB | 2271603 A | 4/1994 |
| WO | 2015135451 A1 | 9/2015 |

OTHER PUBLICATIONS

ISA/US, Notification of Transmittal of the International Search Report and the Written Opinion of the International Searching Authority, or the Declaration, Sep. 25, 2018, PCT/US2018/044893, ISA/US, Alexandria, Virginia, United States of America.

(Continued)

*Primary Examiner* — Mark A Williams

(57) ABSTRACT

The present gate handle includes a push button that is pushed before the gate handle is slid from a closed position to an open position on top of a support member. The support member includes a resilient button that extends into the gate handle and is pushable out of the gate handle by the push button. The support member further includes side slots that are engaged by side slides extending from the handle.

2 Claims, 12 Drawing Sheets

Related U.S. Application Data continuation of application No. 16/041,725, filed on Jul. 20, 2018, now Pat. No. 10,774,587.

(60) Provisional application No. 62/540,492, filed on Aug. 2, 2017.

(51) Int. Cl.

| | |
|---|---|
| *E05B 17/20* | (2006.01) |
| *E05C 1/04* | (2006.01) |
| *E06B 9/00* | (2006.01) |

(56) References Cited

U.S. PATENT DOCUMENTS

| | | | | |
|---|---|---|---|---|
| 7,540,046 | B1 * | 6/2009 | Lai | A47D 13/065 5/100 |
| 9,382,740 | B2 | 7/2016 | Flannery | |
| 9,382,750 | B1 | 7/2016 | Flannery | |
| 9,388,603 | B2 * | 7/2016 | Flannery | E05B 53/001 |
| 9,410,348 | B1 | 8/2016 | Flannery et al. | |
| 9,464,467 | B1 * | 10/2016 | Flannery | E05B 65/0007 |
| 9,689,197 | B1 | 6/2017 | Flannery et al. | |
| 9,822,585 | B2 | 11/2017 | Flannery et al. | |
| 9,874,055 | B1 * | 1/2018 | Flannery | E06B 9/04 |
| 10,400,487 | B1 | 9/2019 | Flannery | |
| 10,415,290 | B1 | 9/2019 | Flannery | |
| 10,774,587 | B2 | 9/2020 | Flannery | |
| 11,041,340 | B1 | 6/2021 | Flannery | |
| 11,371,264 | B2 | 6/2022 | Zhang | |
| 2002/0002795 | A1 | 1/2002 | Rogers | |
| 2005/0028947 | A1 | 2/2005 | Waldman | |
| 2006/0175028 | A1 * | 8/2006 | Askinasi | E06B 9/02 160/225 |
| 2006/0207180 | A1 * | 9/2006 | Cheng | E05B 65/0014 49/57 |
| 2008/0265233 | A1 | 10/2008 | Flannery | |
| 2011/0308160 | A1 * | 12/2011 | Boucquey | E05B 65/0007 49/50 |
| 2012/0011775 | A1 * | 1/2012 | Chen | E05B 47/004 49/358 |
| 2013/0221304 | A1 * | 8/2013 | Wang | E06B 9/04 256/73 |
| 2015/0089873 | A1 | 4/2015 | Marsden et al. | |
| 2015/0184441 | A1 | 7/2015 | Flannery et al. | |
| 2015/0252596 | A1 | 9/2015 | Liang | |
| 2018/0148954 | A1 * | 5/2018 | Raffi | E05B 59/00 |
| 2019/0078353 | A1 | 3/2019 | Gentil | |
| 2019/0145127 | A1 * | 5/2019 | Flannery | E06B 9/04 49/465 |
| 2019/0234139 | A1 * | 8/2019 | Flannery | E06B 11/022 |

OTHER PUBLICATIONS

ISA/US, International Search Report, Sep. 25, 2018, PCT/US2018/044893, ISA/US, Alexandria, Virginia, United States of America.
ISA/US, Written Opinion of the International Searching Authority, Sep. 25, 2018, PCT/US2018/044893, ISA/US, Alexandria, Virginia, United States of America.
WIPO, Notification Concerning Transmittal of International Preliminary Report on Patentability dated Feb. 13, 2020 (one page) in PCT/US2018/044893, Geneva, Switzerland.
WIPO, International Preliminary Report on Patentability of Feb. 4, 2020 (five pages) in PCT/US2018/044893, Geneva, Switzerland.

* cited by examiner

PUSH AND SLIDE GATE HANDLE

This application is a continuation of U.S. patent application Ser. No. 17/019,178 filed Sep. 11, 2020 (U.S. Pat. No. 11,788,350 issued Oct. 17, 2023) and claims the benefit thereof under 35 U.S.C. § 120, which application is a continuation of U.S. patent application Ser. No. 16/041,725 filed Jul. 20, 2018 (U.S. Pat. No. 10,774,587 issued Sep. 15, 2020) and claims the benefit thereof under 35 U.S.C. § 120, which application claims the benefit under 35 U.S.C. 119(e) of U.S. Provisional Patent Application No. 62/540,492 filed Aug. 2, 2017, all of which applications are hereby incorporated by reference in their entireties into this application.

FIELD OF THE INVENTION

The present invention relates to a handle, more particularly to a gate handle, and specifically to a gate handle having a push button that is pushed before a sliding action is initiated.

BACKGROUND OF THE INVENTION

A gate may have a pivoting proximal end and a swinging distal end. The pivoting proximal end has a vertical axis about which the gate swings. Generally, the pivoting proximal end stays put. On the other hand, the swinging distal end may move with great speed over a relatively great segment of an arc. For example, the swinging distal end of a gate may swing almost 180 degrees to the front and almost 180 degrees to the back.

Some gates are like French doors. French doors have first and second pivot proximal axis spaced apart and swinging distal ends adjacent to each other. The swinging distal ends can move with great speed relative to each other and relatively closely to each other and knock off latch parts or handle parts or other types of mechanisms that extend between the distal ends of the gates, especially latch parts or handle parts or other mechanisms that have automatic return features that automatically extend over to the distal end of the other gate before the closing speed of the gate has been stopped. Even latch parts or handle parts designed to have automatic catch or capture features to catch or capture a rapidly closing distal end of the other gate can be broken by rapidly closing distal ends.

SUMMARY OF THE INVENTION

A feature of the present invention is the provision in a gated barrier, of a barrier frame, of a first gate engaged to the barrier frame and having a first distal end portion, and of a second gate engaged to the barrier frame and having a second distal end portion.

Another feature of the present invention is the provision in such a gated barrier, of a handle between the first and second distal end portions of the first and second gates, where the handle is engaged on the first distal end portion of the first gate, where the handle is slideable on the first distal end portion of the first gate, where the handle includes a closed position where the handle receives a section of the second distal end portion of the second gate, and where the handle includes an open position where the handle is disengaged from the section of the second distal end portion of the second gate.

Another feature of the present invention is the provision in such a gated barrier, of the first distal end of the first gate having a first support member with a top face and opposing first and second sides, where the top face includes a top opening, and where the first side includes a first slot and the second side includes a second slot.

Another feature of the present invention is the provision in such a gated barrier, of the support member having a resilient button, where the resilient button is aligned with the top opening and is biased to extend through the top opening.

Another feature of the present invention is the provision in such a gated barrier, of the handle having a front end, a rear end, and a base extending internally through the handle from the front end to the rear end, where the base includes an underside riding on the top face of the first support member, and where the base further includes a base opening alignable with the top opening of the first support member.

Another feature of the present invention is the provision in such a gated barrier, of the handle having a top extending from the front end to the rear end, where the top includes a button opening.

Another feature of the present invention is the provision in such a gated barrier, of the handle having a push button extending through the button opening when the handle is in each of the closed and open positions, where the push button is extendable into the base opening to push the resilient button out of the base opening such that the handle can slide from the closed position to the open position.

Another feature of the present invention is the provision in such a gated barrier, of the handle having a pair of first and second housing portions depending from the base, where the first housing portion includes a first slide extending inwardly, where the second housing portion includes a second slide extending inwardly, and where the first and second slides respectively engage the first and second slots of the first support member when the handle is in the open and closed positions.

Another feature of the present invention is the provision in such a gated barrier, of the resilient button engaging the top opening of the support member and the base opening of the base when each of the first and second slides is in a respective rear end of the respective first and second slots and when the handle is in the closed position.

Another feature of the present invention is the provision in such a gated barrier, of the underside of the base sliding on a top face of a support member of the second distal end of the second gate as the handle is returning to the closed position from the open position.

Another feature of the present invention is the provision in such a gated barrier, of the push button including a top and where the top of the push button is a peak of the handle relative to the base of the handle.

Another feature of the present invention is the provision in such a gated barrier, of the top of the handle tapering rearwardly and upwardly from the front end of the handle and where the top of the handle tapers frontwardly and upwardly from the rear end of the handle.

Another feature of the present invention is the provision in such a gated barrier, of a ramp being disposed between the front end and the push button, where the ramp includes an upper surface tapering upwardly and rearwardly and terminates adjacent to a top side of the push button.

Another feature of the present invention is the provision in such a gated barrier, of the push button including a rear side and rear corner portions, where each of the rear side and rear corner portions tapers upwardly and toward a center of a top of the push button.

Another feature of the present invention is the provision in such a gated barrier, of an underside of the push button resting upon the top side of the first support member when the handle is in the open position.

Another feature of the present invention is the provision in such a gated barrier, of the resilient button including a top end and where the top end is biased against an underside of the base when the handle is in the open position.

Another feature of the present invention is the provision in such a gated barrier, of a distance between the first and second housing portions of the handle is about equal to or less than a distance between outer faces of the opposing sides of the first support member such that the handle frictionally slides on the support member and such that the handle is frictionally resistant to sliding from either the closed position or the open position.

An advantage of the present invention is that, when the present handle is considered in isolation from the present gated barrier, two actions are required for one of the gates to open, where the two actions are a push of a button and a slide of the handle.

Another advantage of the present invention is that, when the present handle is considered in combination with the present gate barrier, three actions are required for one of the gates to open, where the three actions are a push of a button, a slide of a handle, and a lifting of the gate that is to be opened.

Another advantage of the present invention is that the top side of the handle includes a low profile. One of the features contributing to this advantage is that the top of the button is the peak of the push button such that the peak of the push button is disposed further from a longitudinal base of the handle than any other feature of the handle. Another feature contributing to this advantage is that the top side of the handle tapers upwardly and rearwardly from a front end of the handle to the top front of the button. Another feature contributing to this advantage is that the top side of the handle tapers upwardly and frontwardly from a rear end of the handle to the rear of the button.

DESCRIPTION

Figure 1:
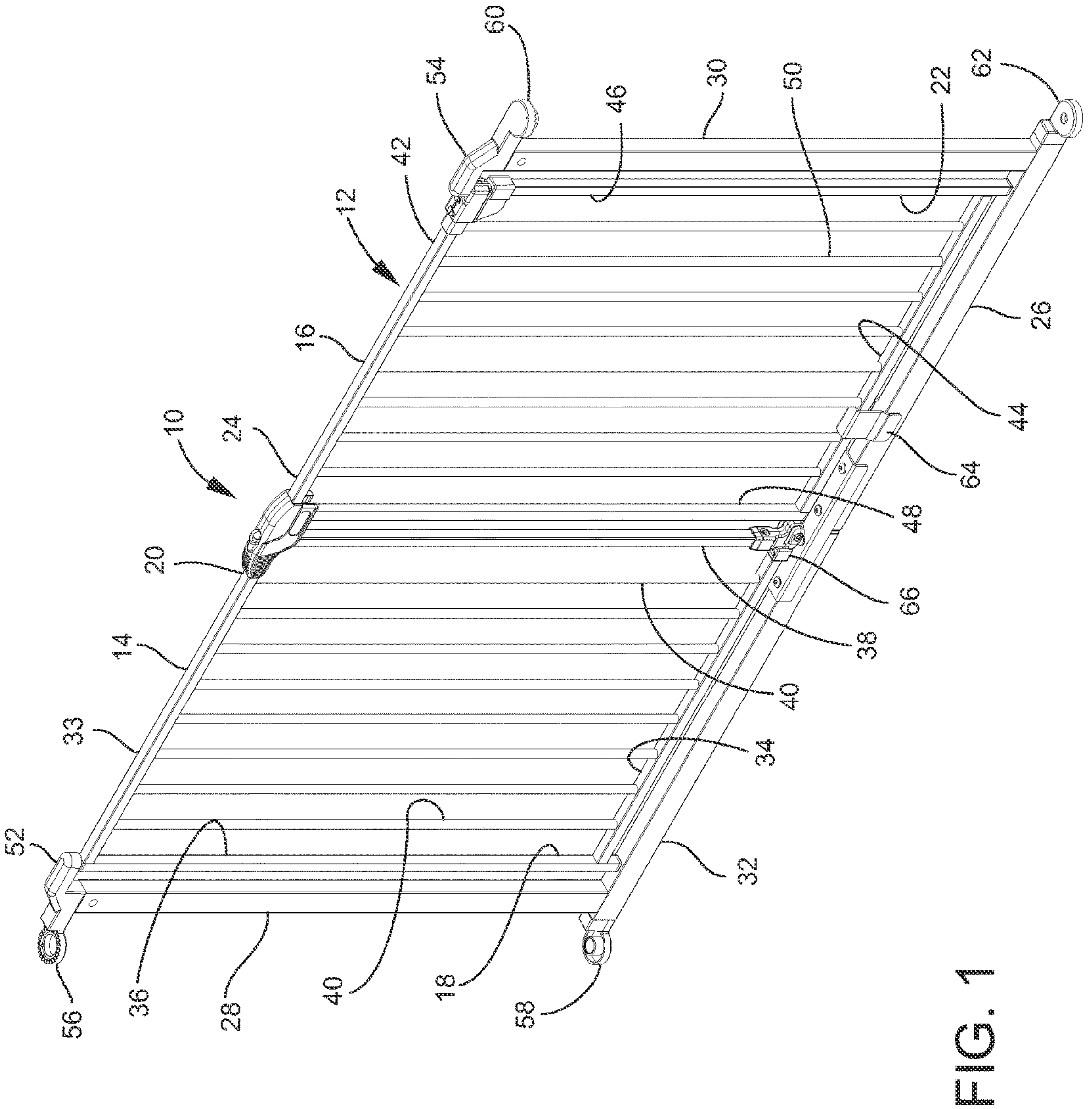
FIG. 1 is a perspective view of a barrier having two gates, where the present push and slide handle is disposed between the upper portions of swinging distal ends of the two gates.
Figure 2A:
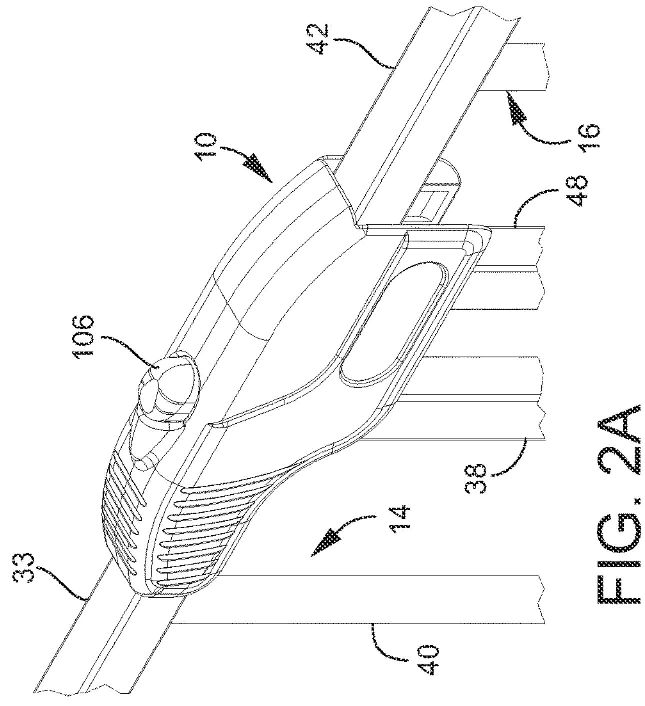
FIG. 2A is a perspective detail view of the push and slide handle of FIG. 1 where the button is upright and the handle is in a closed position.
Figure 2B:
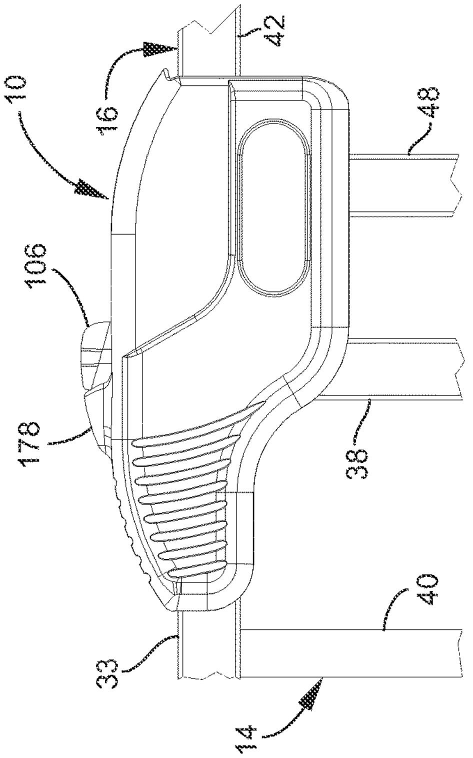
FIG. 2B is an elevation view of the push and slide handle of FIG. 2A where the button is upright and the handle is in a closed position.
Figure 2C:
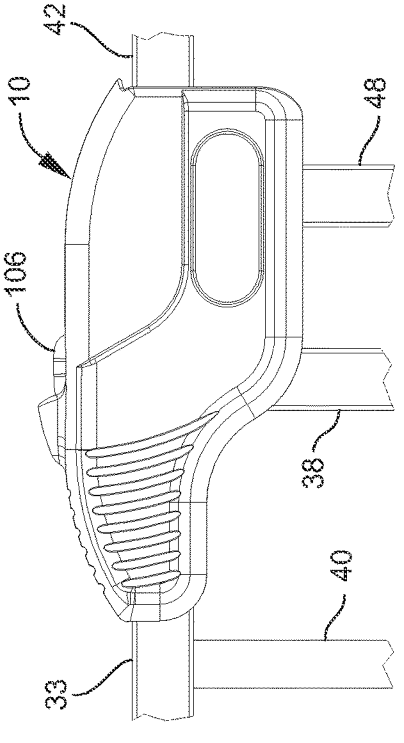
FIG. 2C is an elevation view of the push and slide handle of FIG. 2A where the button has been depressed and the handle is in a closed position.
Figure 2D:
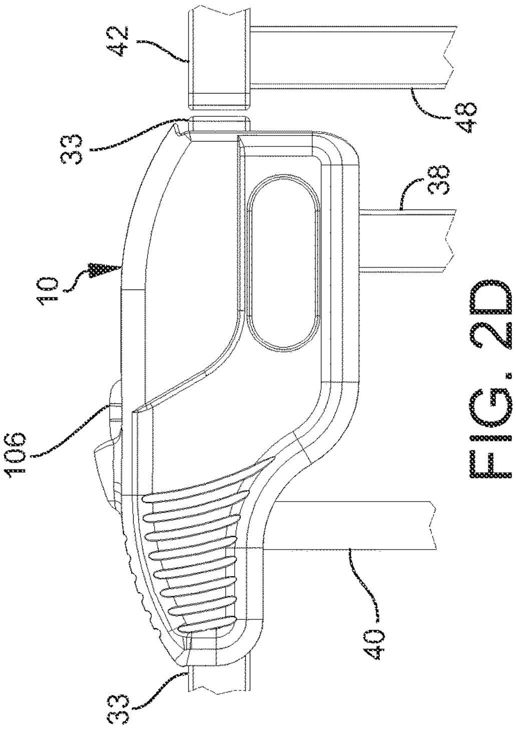
FIG. 2D is an elevation view of the push and slide handle of FIG. 2A where the button has been depressed and the handle has been slid to an open position.
Figure 3B:
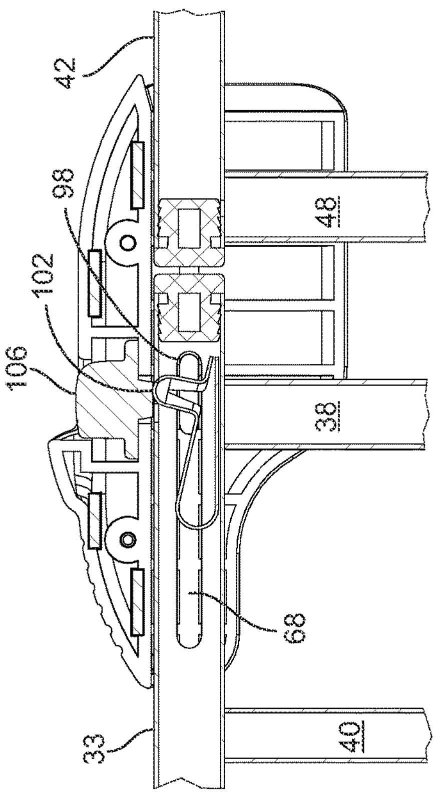
FIG. 3B is a section view of the push and slide handle of FIG. 2C where the button has been depressed and the handle is in a closed position.
Figure 3A:
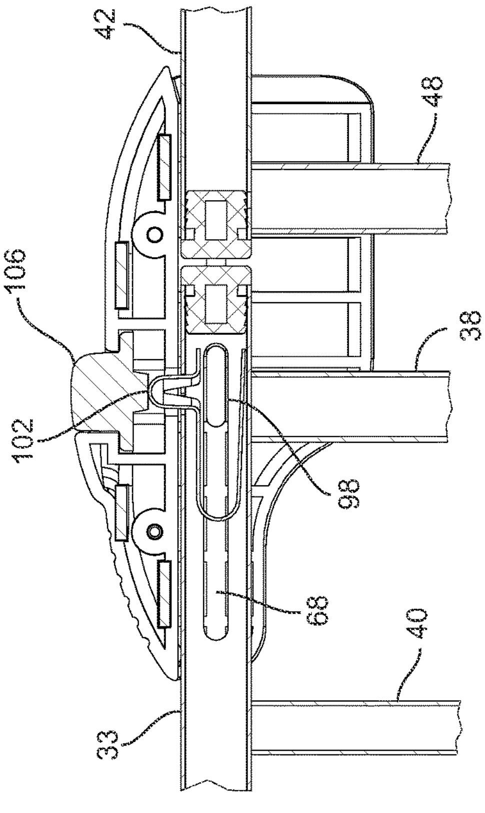
FIG. 3A is a section view of the push and slide handle of FIG. 2B where the button is upright and the handle is in a closed position.
Figure 3C:
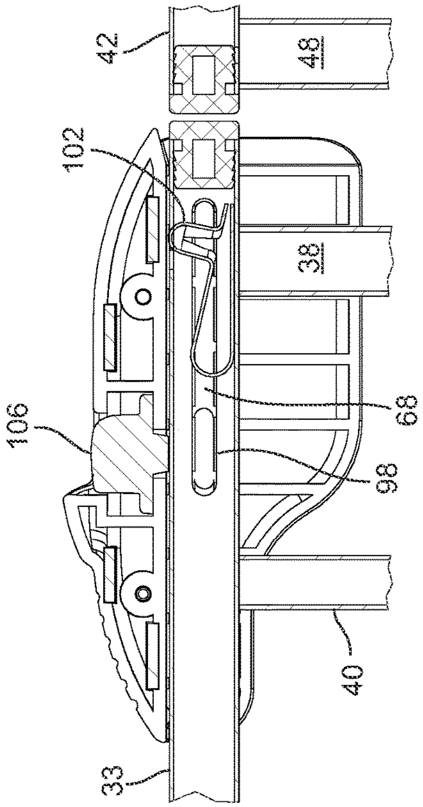
FIG. 3C is a section view of the push and slide handle of FIG. 2D where the button has been depressed and the handle has been slid to an open position.
Figure 4:
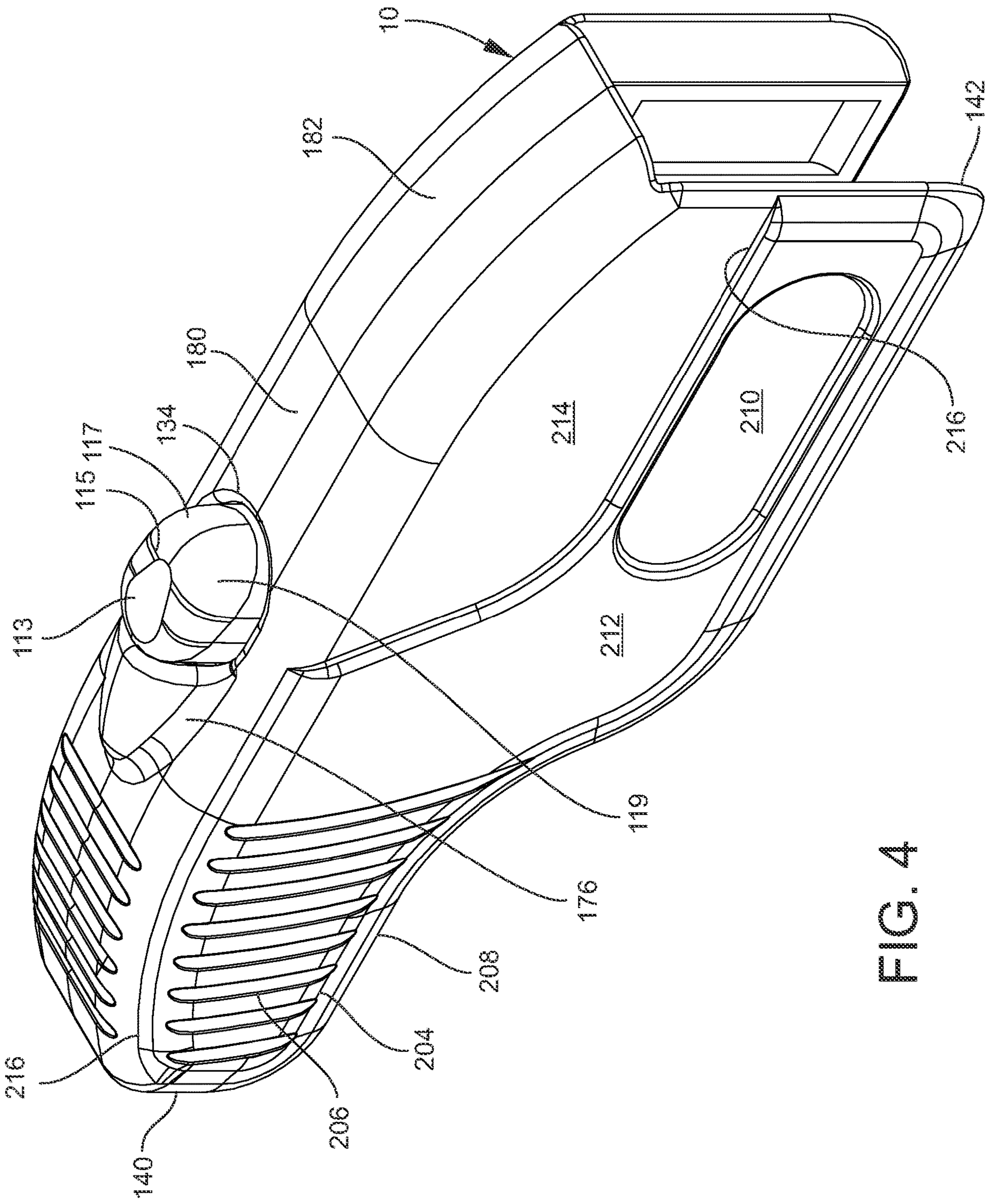
FIG. 4 is a detail perspective view of the push and slide handle of FIG. 1 isolated from the distal ends of the gates.

As shown in FIG. 1, the present push and slide gate handle is indicated by reference number 10. The handle 10 is on a barrier 12 having first and second gates 14, 16. First gate 14 includes a pivoting proximal end 18 and a swinging distal end portion 20. Second gate 16 includes a pivoting proximal end 22 and a swinging distal end portion 24. The handle 10 is engaged between upper portions of the swinging distal end portions 20, 24.

Barrier 10 includes a U-shaped frame 26 having first and second upright standards 28, 30 and one or more threshold support members 32 running to and between lower portions of the standards 28, 30. First and second gates 14, 16 are pivotally engaged to the frame 26 between the standards 28, 30. First and second gates 14, 16 and frame 26 are disposed in a common plane when the first and second gates 14, 16 are closed.

First gate 14 includes a frame having upper and lower horizontally or transversely extending support members 33, 34, an outer end vertical support member 36, an inner end vertical support member 38, and set of inner vertically extending support members 40. Outer end vertical support member 36 defines the pivot axis of the first gate 14.

Second gate 16 includes a frame having upper and lower horizontally or transversely extending support members 42, 44, an outer end vertical support member 46, an inner end vertical support member 48, and set of inner vertically extending support members 50. Outer end vertical support member 46 defines the pivot axis of the second gate 16.

Standard 28 includes an upper and inwardly extending projection 52 for engaging the proximal end 18 of gate 14. Standard 30 includes an upper and inwardly extending projection 54 for engaging the proximal end 22 of gate 16.

Standard 28 includes an upper and outwardly extending projection 56. Projection 56 vertically opposes a projection 58 engaged to an outer end of threshold support member 32. Projections 56, 58 engage fencing, a post, a vertical surface or another object.

Standard 30 includes an upper and outwardly extending projection 60. Projection 60 vertically opposes a projection 62 engaged to the other outer end of threshold support member 32. Projections 60, 62 engage fencing, a post, a vertical surface or another object.

Barrier 10 includes an inverted U-shaped lift stop 64. Lift stop 64 engages lower support member 44 of gate 16 and extends to both front and back sides of threshold support member 32 such that gate 16 cannot swing until gate 16 is lifted. Then gate 16 may swing forwardly and rearwardly.

Barrier 10 includes a latch 66 on gate 14 that engages the threshold support member 32 such that gate 14 must be lifted prior to gate 14 being swung open. Then gate 14 may swing forwardly and rearwardly.

Figure 11A:
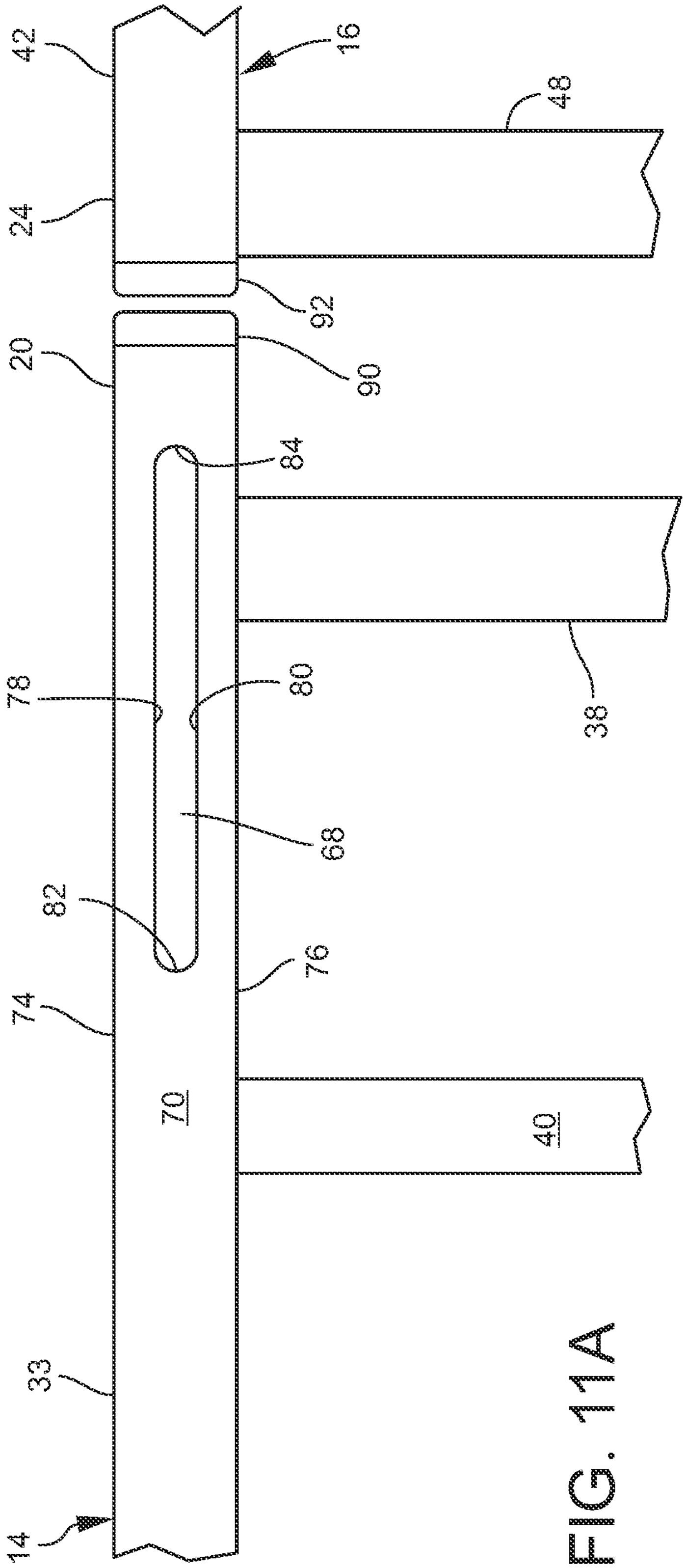
FIG. 11A is a side isolated view, with the push and slide handle removed, of the swinging distal end portions of the two gates of the barrier of FIG. 1.
Figure 11B:
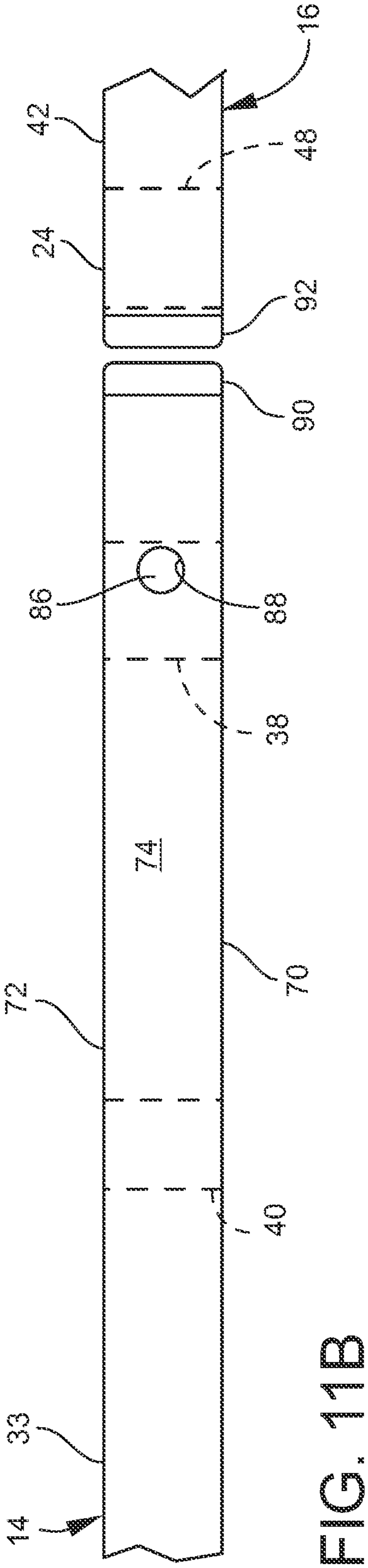
FIG. 11B is a top isolated view, with the push and slide handle removed, of the swinging distal end portions of the two gates of the barrier of FIG. 1.
Figure 12:
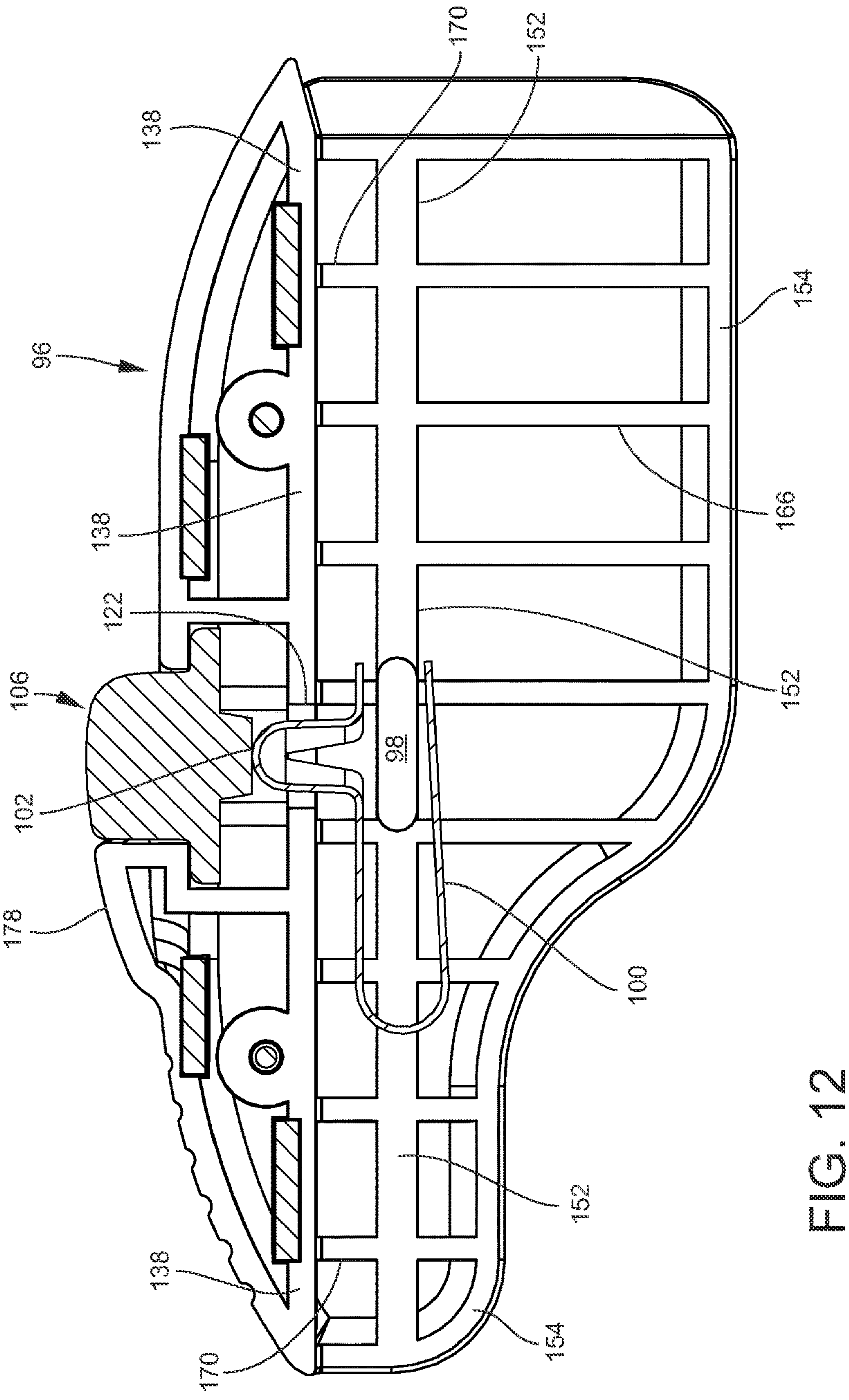
FIG. 12 is a section view of the push and slide handle of FIG. 3A where the button is upright and the handle is in a closed position and where the push and slide handle is isolated, without the upper support members of the gate and end frame.

As shown in FIG. 11A, upper horizontally extending support member 33 includes a front slot 68 formed in a front side 70 of support member 33. Support member 33 may be square or rectangular in shape and include front and rear sides 70, 72 and upper and lower sides 74, 76. Support member 33 is tubular. Front slot 68 is formed by upper and lower edges 78, 80 and inner and outer ends 82, 84. Front slot 68 is oblong in shape.

Upper horizontally extending support member 33 includes a rear slot 68 formed in the rear side 72 of support member 33. Rear slot 68 is formed by upper and lower edges, and inner and outer ends. The rear slot 68 is oblong in shape. The rear slot 68 is identical in shape and position as the front slot 68 except that the rear slot 68 is formed on the rear side 72 of support member 33.

The upper side 74 of upper horizontally extending support member 33 includes an opening 86. Opening 86 is formed by an endless circular edge 88. Opening 86 is disposed adjacent to or confronts the outer end 84 of front slot 68 and the outer end of the rear slot.

Open distal end portion 20 of gate 14 is plugged by a plug 90. Open distal end portion 24 of gate 16 is plugged by a plug 92.

Figure 5:
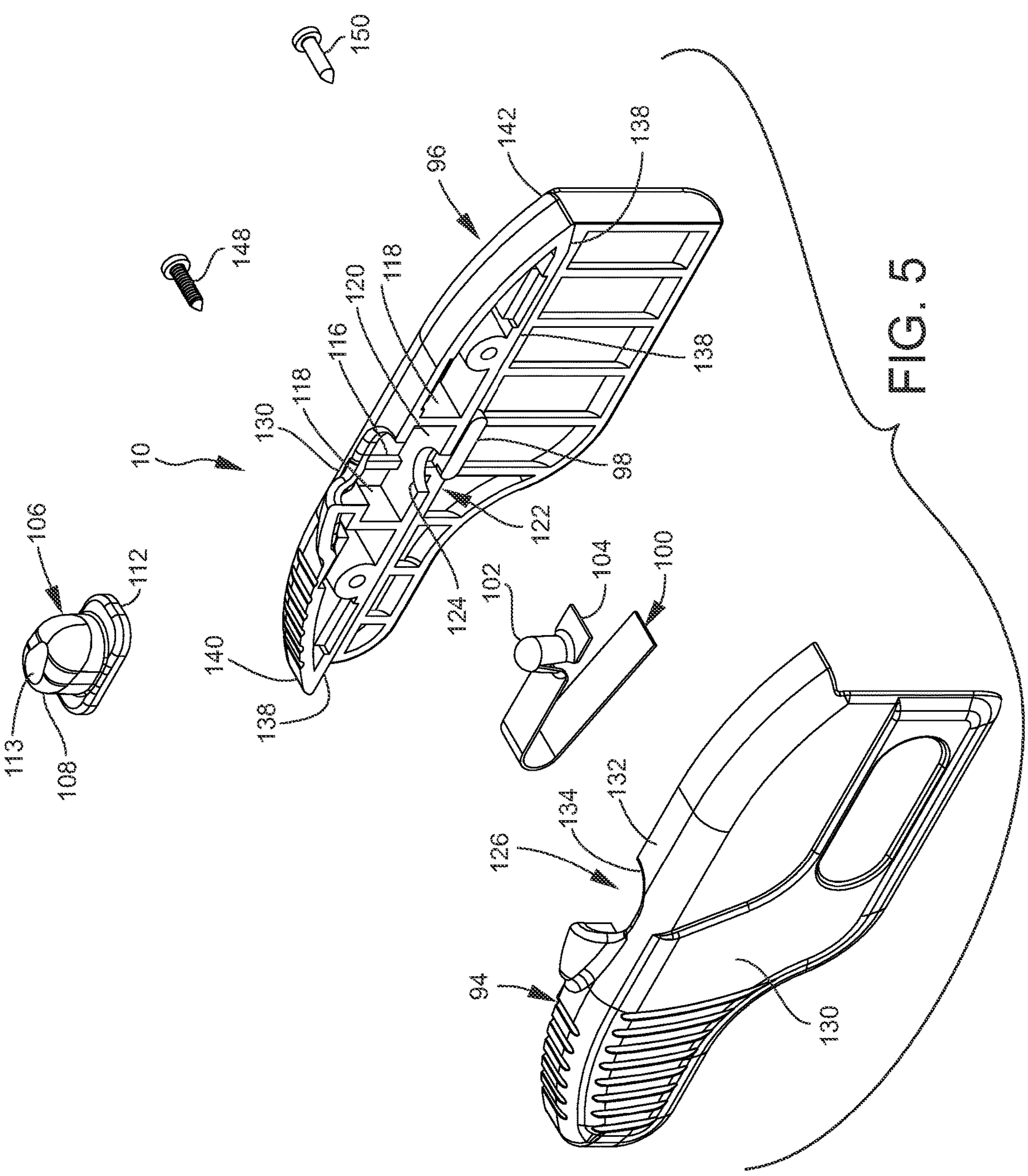
FIG. 5 is a partially cut-away, exploded view of the push and slide handle of FIG. 1.

As shown in FIG. 5, handle 10 includes a front half portion 94 and a rear half portion 96. The front and rear half portions 94, 96 have sections cut away. Each of the half portions 94, 96 includes a slide or rider 98. The slides 98 engage slots 68. The slide 98 of front half portion 94 engages slot 68 formed in front side 70. The slide 98 of rear half portion 96 engages slot 68 formed in rear side 72.

As shown in FIG. 5, barrier 10 includes a V-spring 100 or V-shaped spring 100 or flat spring 100 in the tubular interior of support member 33. V-spring 100 includes a spring button 102 spaced from an upper spring end 104. Such spacing retains the V-spring 100 in the tubular interior of the support member 33 while permitting the button 102 to protrude out of the tubular interior through opening 86.

As shown in FIG. 5, handle 10 includes a push button 106 that pushes down upon spring button 102 that compresses V-spring 100. Push button 102 includes an upper accessible end 108 and a lower hidden end 110 separated by an endless shelf 112. A slight depression 113 is formed on the top of the upper accessible end 108. The depression 113 is formed generally in the shape of a teardrop with opposing sides that taper rearwardly and toward each other. The depression has a curved front end and a curved rear end. The upper end 108 of push button 106 includes grooves 115 that run laterally from side to side of the upper end 108. Grooves 115 are not formed in the depression 113. The depression 113 and grooves 116 provide a roughened surface to the upper end of the push button 106. Upper button end 108 includes a rear end 117 that tapers upwardly and frontwardly toward a top center of upper button end 108. Rear corners 119 of upper button end 108 taper upwardly and toward a top center of the upper button end 108. Sides 121 of the upper button end 108 taper upwardly and inwardly toward a top center of upper button end 108.

Handle 10 includes a compartment 114 that retains the endless shelf 112 and the lower hidden end 110. The compartment 114 is in part defined by a set of four ribs 116 upon which the endless shelf 112 rides. The compartment 114 is further defined in part by longitudinally spaced apart walls 118 upon which the endless shelf 112 also rides. The compartment 114 includes a floor 120 having an opening 122 defined by edges 124. When the handle 10 is in the closed position, opening 122 and opening 86 are aligned and coaxial with each other and are further aligned and coaxial with lower hidden end 110 of push button 106, spring button 102 extends through both of the openings 86, 122, and spring button 102 and lower hidden end 110 engage each other such that spring button 102 exerts an upward force on lower hidden end 110 and push button 106 as a whole. This force keeps upper button end 108 extending through housing opening 126 and accessible to the user of the handle 10. This force exerts the upper face of the endless shelf 112 against the lower face of ceiling 128 of compartment 114. Ceiling 128 has housing opening 126. Compartment 114 is defined by the inner surface of side outer walls 130 where each half portion 94, 96 includes one outer wall 130, vertical ribs 116 where each half portion 94, 96 includes two vertical ribs 116 and the ribs 116 extend laterally from outer wall 130, floor 120 and ceiling 128 where ceiling 128 is the undersurface of a handle top 132.

The height of lower hidden end 110 is the same as the height of floor 120 such that the lower surface of lower hidden end 110 slides on the upper face or side 74 of support member 33 when the spring button 102 is pushed down. The maximum depth to which lower hidden end 110 can be pushed is regulated by the endless shelf 112 that has a greater diameter or greater cross section than does opening 122 such that the stop in the downward direction for lower hidden end 110 is the bottom surface of the endless shelf 112 making contact with the floor 120.

The upper surface of the endless shelf 112 makes contact with the undersurface or ceiling 128 of handle top 130 about opening 126 such that the ceiling 128 serves as a stop for the endless shelf 112. Shelf 112 has a greater longitudinal length and a greater lateral length than does opening 126 that is formed by edge 134.

Handle 10 includes a housing 136. Housing 136 includes front half portion 94 and rear half portion 96. Each of the front and rear half portions 94, 96 are integral and one-piece. Only half portion 96 is described below. Half portion 94 is identical to half portion 96, except where noted. Sister features of half portion 94 will carry the same reference number as its respective feature on half portion 96.

Half portion 96 includes a plate portion 138 or plate like piece 138 or base portion 138 that is disposed longitudinally and horizontally and runs from a front end 140 of the housing 136 to a rear end 142 of the half portion 96. When the half portions 94, 96 are secured together, base portions 138 become a base.

Base portion 138 further extends laterally from sidewall 130 of front half portion 96. Base 138 includes floor portion 120. Opening portion 122 is formed in base portion 138. Slide 98 of half portion 96 is below, runs parallel to, and is spaced from base portion 138. A front boss 144 and a rear boss 146 of half portion 96 are coaxial and align with and abut a respective front boss and a respective rear boss of half portion 94. Pins 148, 150 engage the bosses 144, 146 of each of the half portions 94, 96 to secure half portion 94 to half portion 96. When the half portions 94, 96 are engaged together, the inner edge of base portion 138 of half portion 96 abuts and seals up against the inner edge of the same base portion of half portion 94 so as to form the circular opening 122 and so as to form a common base. Base portion 138 and its associated base portion of half portion 94 slide on the upper surface of the top side 74 of the horizontal support member 33 of gate 14.

Disposed below base portion 138 and spaced from rib 138 is a horizontally and longitudinally extending intermediate rib 152 that extends from the front end 140 of housing 136 to the rear end of housing 136. Rib 152 also extends laterally from sidewall 130. The outer and inner edges of rib 152 are straight. The inner edge of rib 152 slides on the rear side 72 of support member 33 of gate 14. Half portion 94 also has this same rib 152, the inner edge of which slides on the front side 70 of support member 33 of gate 14. The lateral widths of ribs 152 are less than the lateral widths of their respective base portions 138.

Disposed below rib 152 is a bottom rib 154. Bottom rib 154 extends from the front end 140 of half portion 96 to the rear end 142 of half portion 96. Bottom rib 154 extends inwardly from sidewall 130. The lateral widths of ribs 152, 154 are the same such that ribs 152, 154 extend the same distance laterally. Whereas rib 152 is straight and horizontal, bottom rib 154 undulates from the front end 140 to the rear end 142 of housing 136. Rib 154 includes a front convex rib segment 156 that leads into a straight rib segment 158 that leads into a concave rib segment 160 that leads into a convex rib segment 162 that leads into a straight segment 164. Such rib segments are convex or concave relative to an outside of the handle 10.

A set of nine vertical ribs 166 extend laterally from the sidewall 130 and further extend vertically between intermediate rib 152 and bottom rib 154. Ribs 166 extend at a right angle relative to intermediate rib 152. The rearmost ninth vertical rib 166 is adjacent to the rear end 142 of half portion 96. Each of the ribs 166 have an inner face 168 that lies in the same plane as the inner face of intermediate rib 152 that confronts and slides against side face 72 such that upper portions of the vertical ribs 166 slide against side 72 of support member 33 and such that upper portions of the same vertical ribs 166 of half portion 94 slide against side face 70 of support member 33. Such provides a friction fit to the handle 10 on the support member 33.

The rearmost five vertical ribs 166 have the same height. The frontmost four vertical ribs 166 are shorter than the rearmost five vertical ribs 166. The frontmost two vertical ribs 166 are of the same height and extend from straight segment 158. The frontmost two vertical ribs 166 are the shortest of the ribs 166.

Figure 10:
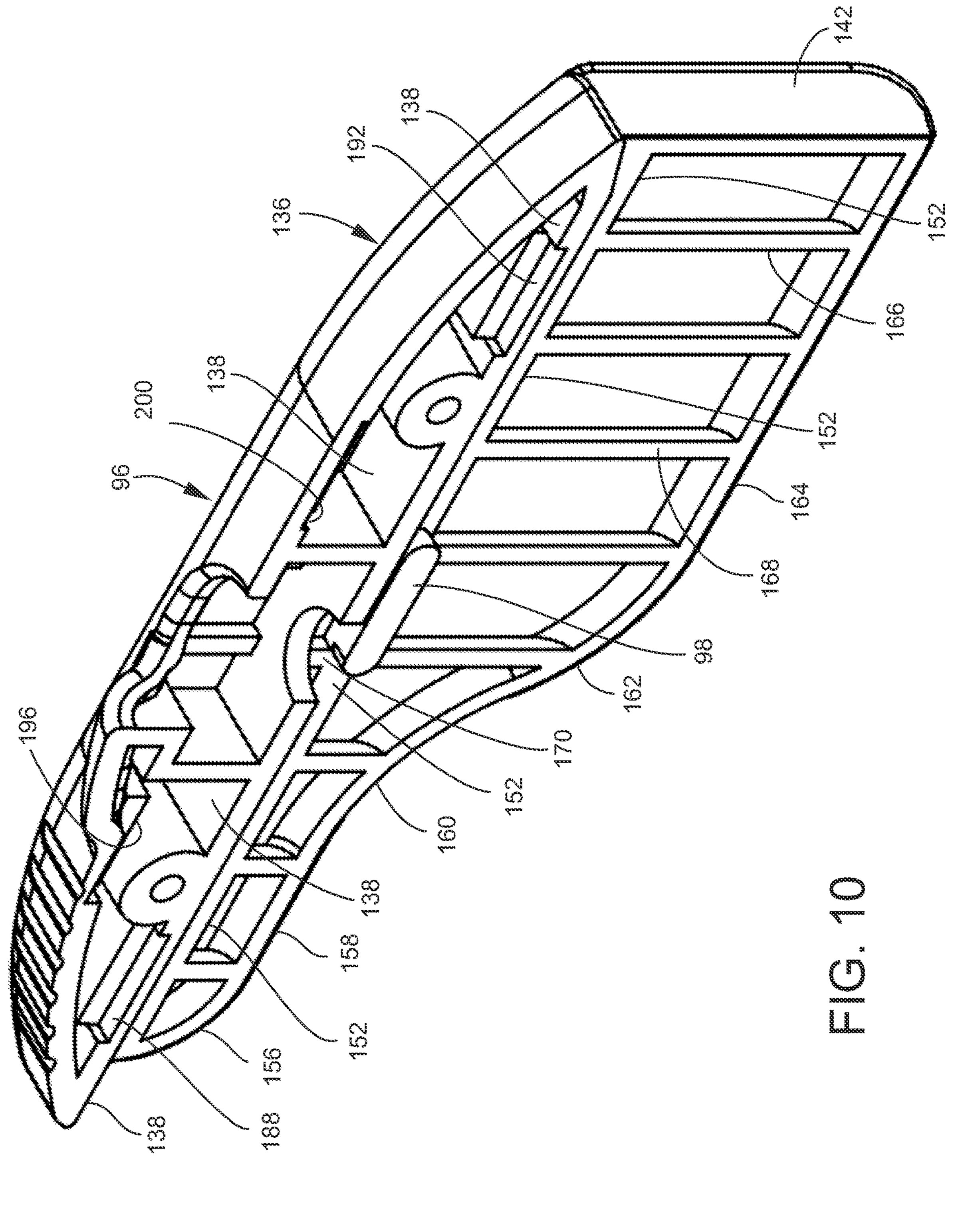
FIG. 10 is a perspective, partially cut-away view of a half-portion of the push and slide handle of FIG. 1.

Each of the vertical ribs 166 have associated vertical rib extensions 170 that extend between intermediate rib 152 and base portion 138. A portion of one of these rib extensions 170 is shown in FIG. 10. Each of the rib extensions 170 is vertically aligned with one of the vertical ribs 166. Each of the rib extensions 170 have inner faces 168 that abut side face 72 of support member 33 or, in the case of half portion 94, abut side face 70 of support member 33.

Slide 98 is one-piece and integral with half portion 96. The outer end of slide 98 extends from intermediate rib 152. The inner end of slide 98 extends through slot 68 and confronts the inner end of the sister slide 98 of the other half portion 94 in the interior of the tubular support member 33. Slide 98 is coplanar with intermediate rib 152.

Base portion 138 mounts bosses 144, 146 that are integral with base portion 138. Base portion 138 includes edge portion 124 that forms opening portion 122. Wall portions 118 extend upwardly from base portion 138. Ribs 116 extend upwardly from base portion 138 to top 132.

Top portion 132 further extends upwardly from base portion 138. From the front end portion 140, top portion 132 extends upwardly and rearwardly. From rear end portion 140, top portion 132 extends upwardly and frontwardly.

Top portion 132 includes a convex portion 172 extending from the front end portion 140. Convex portion 172 is a roughened portion that includes a set of laterally extending straight groove portions 174. Each of the groove portions 174 terminates short of sidewall 130.

Top portion 132 includes one-half of a transitional concave U-shaped portion 176. Transitional concave U-shaped portion 176 is U-shaped such that the closed end of U-shaped portion 176 is adjacent to the rearmost groove portion 174 and the two open ends of the U-shaped portion 176 terminate at the edge 134 that forms opening 126 for the upper end 108 of push button 106.

Figures 9A, 9B, 9C, 9D, 9E:
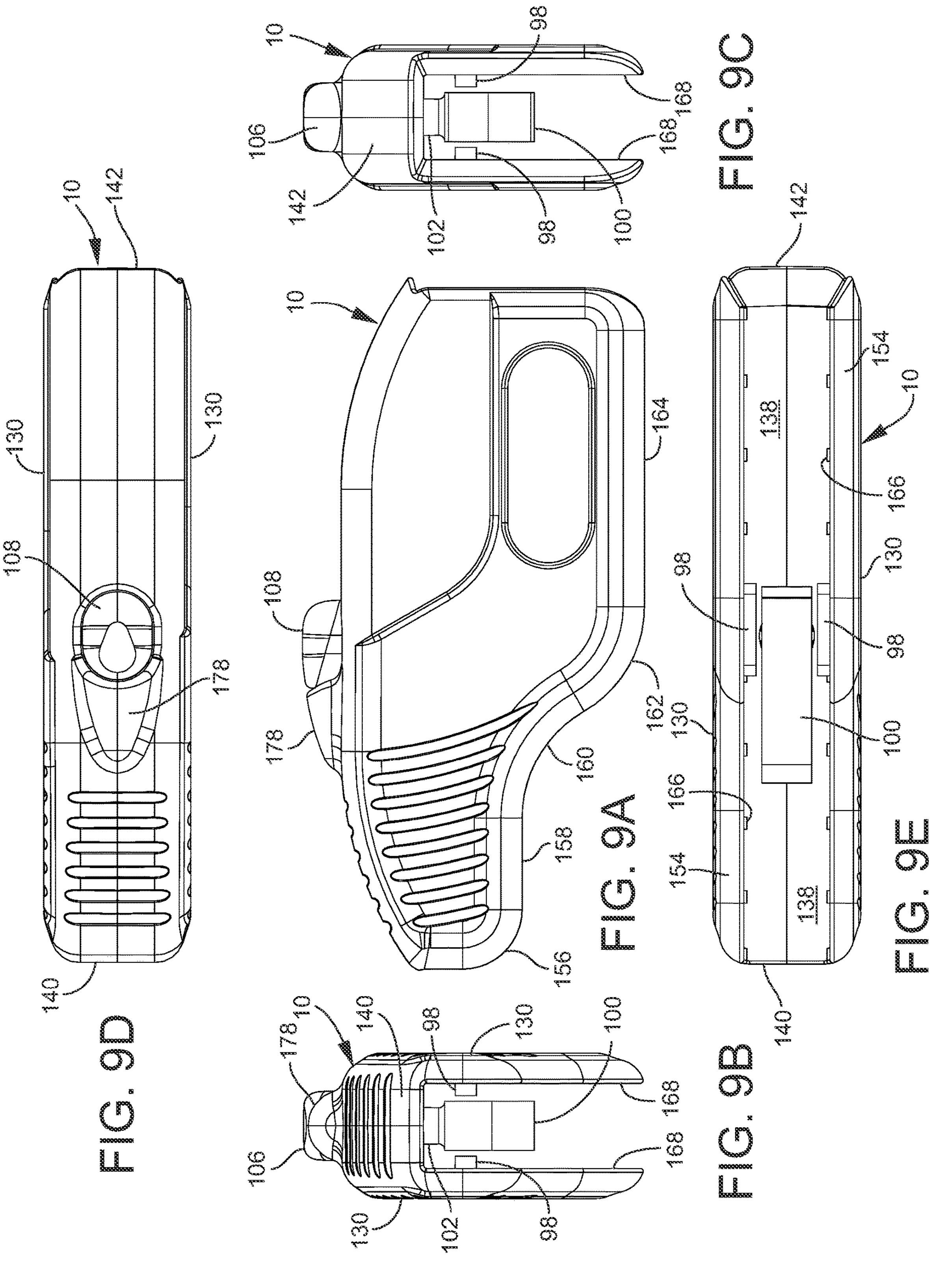
FIG. 9A is a side view of the push and slide handle of FIG. 1.
FIG. 9B is a front end view of the push and slide handle of FIG. 9A.
FIG. 9C is a rear end view of the push and slide handle of FIG. 9A.
FIG. 9D is a top view of the push and slide handle of FIG. 9A.
FIG. 9E is a bottom view of the push and slide handle of FIG. 9A.

Top portion 132 includes a ramp portion 178. The exterior surface of ramp portion 178 is convex. When half portions 94, 96 are combined to form handle 10, a ramp formed of ramp portions 178 has an exterior surface that is frustoconical. The peak of ramp portion 178 lies slightly below the top of upper end 108 of button 106. The top of upper end 108 of button 106 is convex such that the top of upper end 108 of button 106 leads down into ramp portion 178. As shown in FIG. 9D, the width between outer sides of the ends of the U-shaped portion 176 is greater than the lateral width of push button 106. As shown in FIG. 9B, the rear end of the ramp portion 178 confronts a great portion of the front end of push button 106.

Top portion 132 includes a straight segment 180 that runs rearwardly from a rear edge of button opening 126 and that leads into a convex segment 182 that terminates at the rear end 142. The exterior surfaces of straight segment 180 and convex segment 182 are smooth.

Base portion 138 is a mount for the front wall portion 118 that extends upwardly at a right angle from base portion 138. The top of front wall portion 118 leads integrally into a horizontally extending wall portion 184. Wall portion 184 forms a segment of edge 134 that forms opening portion 126 for button 106. A rear end of front wall portion 118 is a mount for an upwardly extending wall portion 186. Wall portion 186 forms a rear portion of ramp portion 178. Wall portion 186 confronts a front side of the upper end 108 of push button 106 when the push button 106 is in the closed or up position, i.e., when the push button 106 has been pushed upwardly by V-spring 100. Wall portion 186 curves from an inner face of wall portion 196 outwardly and rearwardly to track the oblong curvature of the upper end 108 of push button 106.

Base portion 138 of half portion 96 includes a front locator receiver 188 for a rectangular plate locator 190 extending from half portion 94 and a rear locator receiver 192 for a rectangular plate locator 194 extending from half portion 94. Top 132 of half portion 96 includes a front locator receiver 196 for a rectangular plate locator 198 extending from half portion 94 and a rear locator receiver 200 for a rectangular plate locator 202 extending from half portion 94. Each of the locator receivers 188, 192, 196, 200 includes a floor, an end, and two sides.

Each of the sidewalls 130 of each of the half portions 94, 96 includes a roughened front portion 204 that includes a set of slightly curved vertically extending grooves 206. Each of the grooves 206 terminates short of the top 132. Each of the grooves 206 terminates short of a bottom edge 208. Bottom rib 154 includes bottom edge 208. The frontmost groove 206 is adjacent to the front end portion 140. The two rearmost grooves 206 are disposed between segment 160 of bottom rib 154 and a front portion of ramp portion 178. The rearmost groove 206 is disposed further rearwardly than the rearmost groove 174.

Each of the sidewalls 130 of each of the half portions 94, 96 includes a longitudinally extending oblong depression 210. A rear end of the depression 210 is adjacent the rear end portion 142.

Each of the sidewalls 130 includes an outer portion 212 and an inner portion 214. Outer portion 212 is a strip that runs from front end 140 to rear end 142. Outer portion 212 includes the grooves 206 and the oblong depression 210. Inner portion 214 is disposed above a rear portion of outer portion 212. Inner portion 214 has an exterior surface that is flush with the exterior surface of the top 132. Outer portion 212 is raised relative to inner portion 214. A rise or transition 216 extends from the front end portion 140 to the rear end portion 142. The rise 216 separates the outer portion 212 from the lower portion 214. A first segment of the rise 216 extends from the front end portion 140 to about the longitudinal depth of the middle of the upper button end 108. A second segment of the rise 216 extends from about the longitudinal depth of the middle of the upper button end 108 to the rear end 142. The rear portion of the second segment of the rise 216 runs parallel to the bottom face 76 of support member 33 and runs adjacent to a plane defined by bottom face 76 such that by feel and by sight a user can track where the rear end 142 of the handle 10 is relative to support members 33 and 42. A front portion of the second segment of the rise 216 runs from the front of the rear portion of the second segment of the rise 216 to terminate short of the top portion 132 and to terminate adjacent to middle of the upper button end 108 such that a user can track by feel and by sight how to get from the push button 106 to the oblong depression 210 where a user may wish to place one or more of his or her fingers. The front portion of the second segment of the rise 216 is adjacent to the front of the oblong depression 210.

The transition from the sidewall portion 130 of each of the half portions 94, 96 to the top portion 132 of each of the half portions 94, 96 is curved from the front end portion 140 to the rear end portion 142.

As shown in FIGS. 9B and 9C, handle 10 or housing 136 when assembled is formed in an inverted U-shaped when viewed from either front end portions 140 and rear end portions 142. In other words, handle 10 or housing 136 when assembled includes an upper body and two lower bodies. The upper body contains the button 106, the base portions 138, the bosses 144, 146, the locators 190, 194, 198, 202 and their respective receivers 188, 192, 196, and 200, the ramp portions 178 the grooves 174, and the button compartment 114, and other features. Each of the two lower bodies include intermediate rib 152, bottom rib 154, vertical ribs 166, vertical rib extensions 170, oblong depression 210, and other features.

Each of the upper body and two lower bodies includes the vertical grooves 206, the outer sidewall portion 212, the inner sidewall portion 214, and the rise 216.

Figure 6:
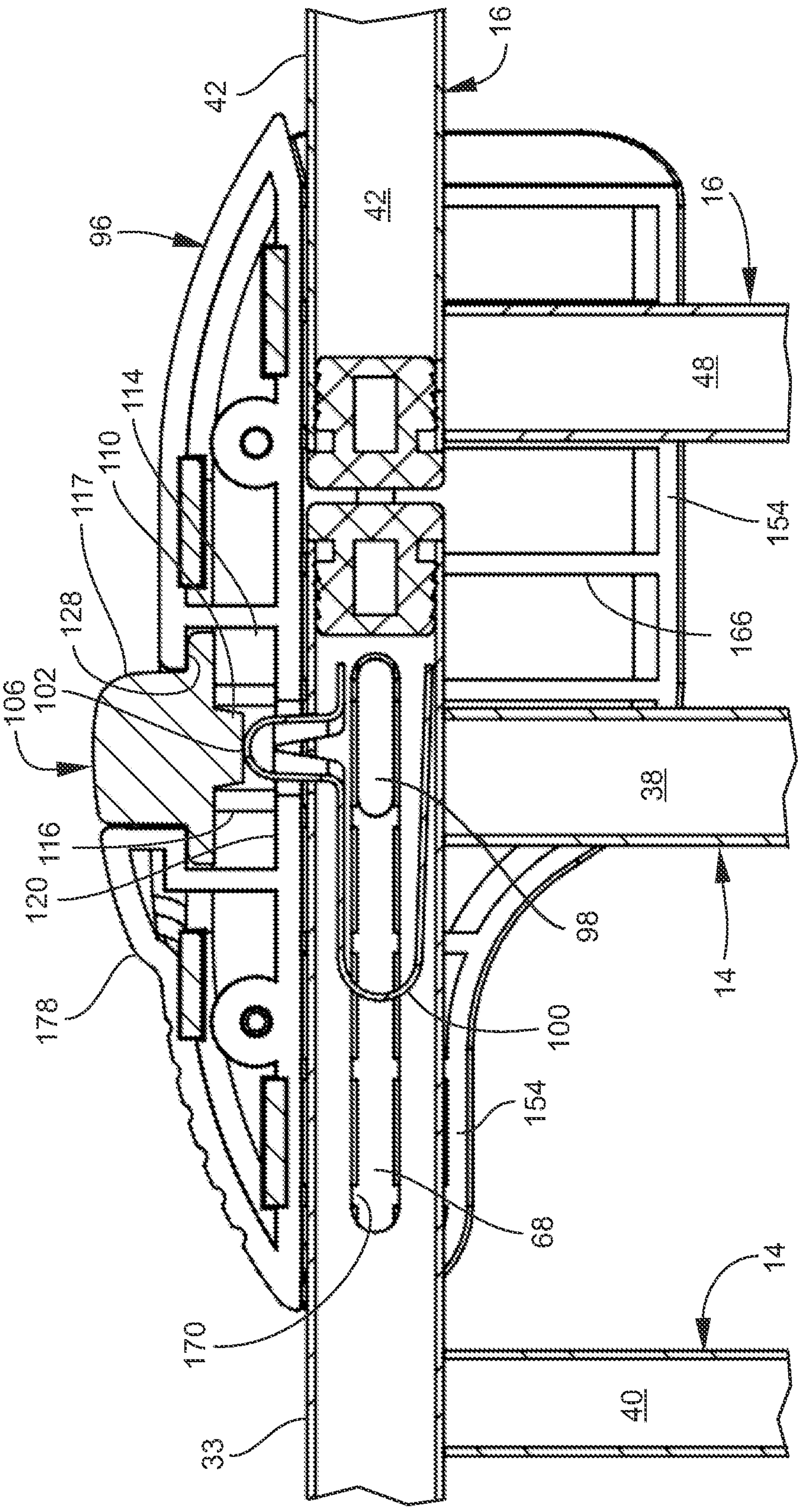
FIG. 6 is an enlarged view of FIG. 3A.
Figure 7:
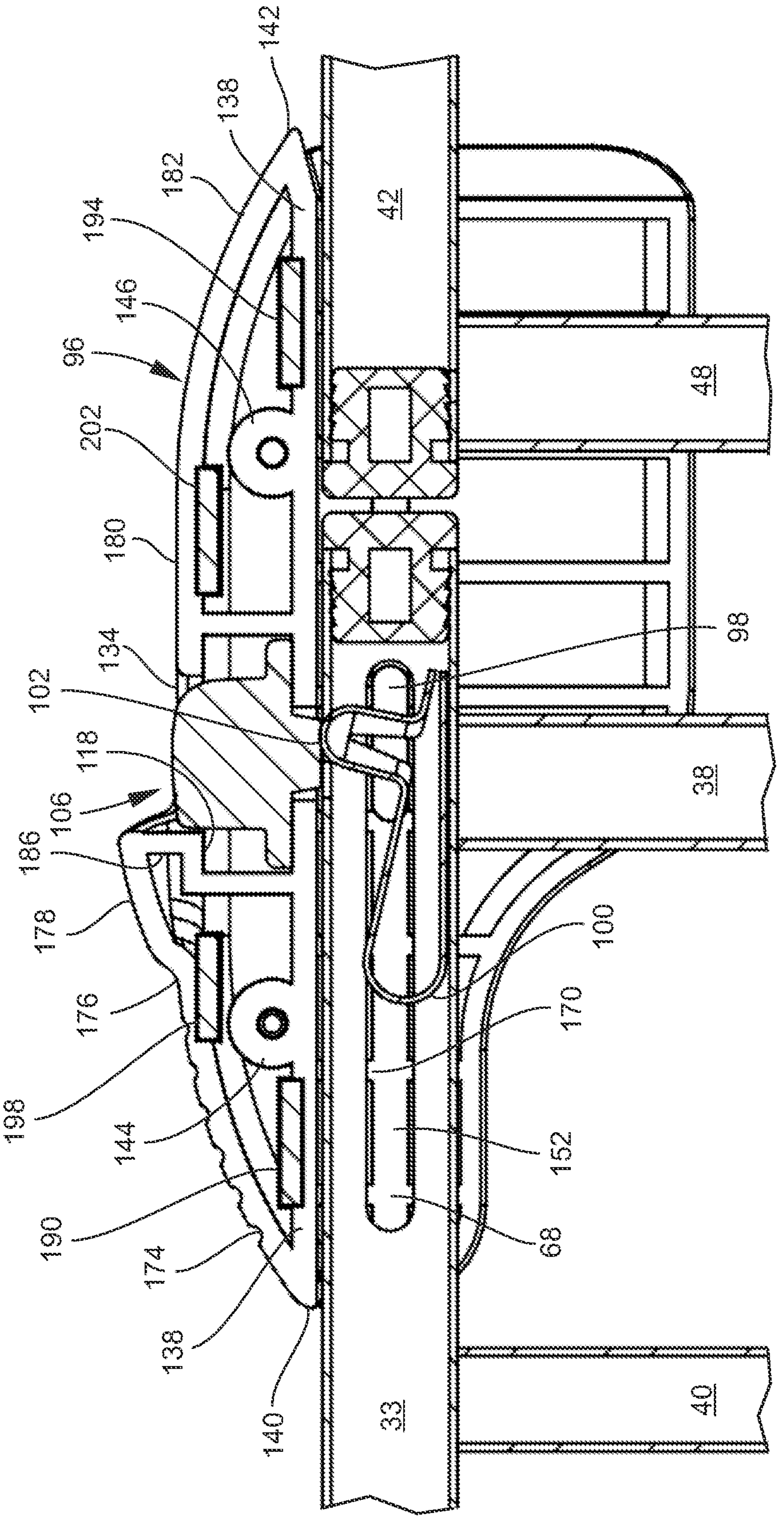
FIG. 7 is an enlarged view of FIG. 3B.

In operation, as shown in FIG. 6, handle 10 is in a locked or closed position. The spring button 102 is in the extended position. The spring button 102 extends through opening 86 of support member 33 and further through opening 122 of base portion 138 such that handle 10 cannot slide forwardly and such that handle 10 cannot slide rearwardly without destroying the integrity of the handle 10, the support member 33, or the V-spring 100. In this closed position, the distal end portion 24 of support member 42 of gate 16 is received in the handle 10 to the depth of the rear boss 146. The base portion 138 confronts and abuts the upper face of support member 42 and the upper face 74 of support member 33. The inner faces 168 of ribs 166, the inner faces of rib extensions 170, and the inner face of intermediate rib 152 confront and abut the side faces of support member 42 and the side faces 70, 72 of support member 33 to minimize side to side movement of the gates 14, 16 relative to each other. The engagement of the elongate slides 98 in the elongate slots 68 combined with the base portions 138 confronting and abutting the upper face of support member 42 and the upper face 74 of support member 33 minimize vertical movement of the gates 14, 16 relative to each other.

In operation, to move the handle 10 from the closed position, the push button 106 is depressed such that hidden end 110 pushes the spring button 102 until the top of the spring button 102 clears the underside of the base portions 138, whereupon the hand of the user may slide the handle 10 in a direction from the rear end 142 of the handle 10 to the front end 140 of the handle 10. The handle 10 does not slide in the opposite direction toward gate 16 because slides 98 are in the rear ends of the slots 68. When the top of the spring button 102 clears the underside of the base portions 138, the underside of the shelf 112 of the push button 106 makes contact with the upper faces of the base portions 138, thereby stopping a further depression of the push button 106, which further depression may lead to an engagement of the hidden end 110 with edge 88 of opening 86, which may stop a sliding of the handle 10.

Figure 8:
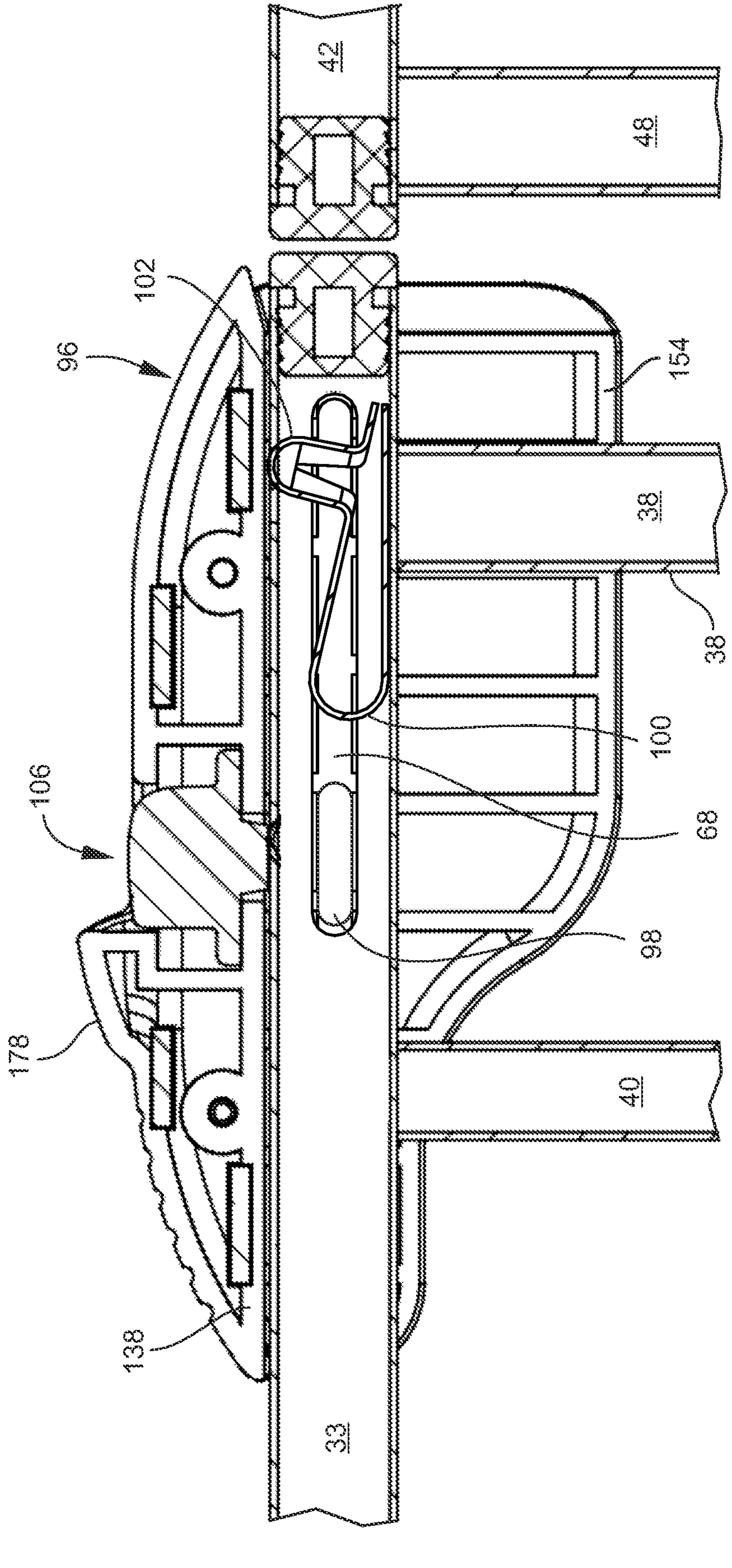
FIG. 8 is an enlarged view of FIG. 3C.

In operation, at some point after the handle 10 begins to slide, the rear portion 142 of the handle 10 clears the inner end of the distal end portion 24 of gate 16 and the plug 92 plugged into the inner end of the distal end portion 24. At this point gate 16 may be lifted and then swung in either direction. As the handle 10 is slid, the bottom end of hidden end 110 of push button 106 slides on the upper face 74 of support member 33. As the handle 10 is slid, the upper end of spring button 102 slides upon the undersurface of base portions 138 and the V-spring 100 remains at its permanent location in support member 33 above the inner end support member 38 where the lower end of the V-spring 100 may be affixed to the upper inside face of the bottom side 76 of support member 33. Sliding of the handle 10 is terminated by the front ends of the slides 98 confronting and abutting the front edges 82 of the slots 68, as shown in FIG. 8. Handle 10 then remains at this location until slid the other way by the user 10. Handle 10 is friction fit on support member 33 by one or more of the height of slides 98 relative to the height of slot 68, by the distance between inner surface 168 of half portion 94 and inner surface 168 of half portion 96 relative to the distance between the outer faces of sides 70, 72 of support member 33.

In operation, to move the handle 10 to the closed position to and over distal end portion 24 of gate 16, the user overcomes the friction fit and slides the handle 10 until the spring button 102 encounters opening 122, whereupon the spring button 102 extends to push the hidden end 110 and push button 106 upwardly, whereupon spring button 102 engages and extends through opening 122 to prevent further sliding of handle 10 in the direction of gate 16. Here the top of the push button 106 rises to its rest position just above the peak of the ramp portions 178. Here the slides 98 are disposed in the rear end of slots 68 to further aid in preventing further sliding of handle 10 in the direction of gate 16.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A handle assembly for being operably oriented between first and second structures of a gate assembly, the first structure having a first end portion and the second structure having a second end portion, the handle assembly comprising:

a) a handle between the first and second end portions of the first and second structures, the handle being engaged on the first end portion of the first structure, the handle being slideable on the first end portion of the first structure, the handle having a closed position where the handle receives a section of the second end portion of the second structure, and the handle having an open position where said handle is disengaged from said section of the second end portion of the second structure;

b) the first end portion of the first structure having a first support member with a top face and opposing first and second sides, said top face having a top opening, said first side having a first slot and said second side having a second slot;

c) the handle having a first slide that engages the first slot and a second slide that engages the second slot; and d) the handle having a button that engages the top opening to thereby disengage a lock, in the first support member, from the top opening to permit the handle to slide.

2. The handle assembly of claim 1, and further comprising a barrier frame, wherein the first structure comprises a gate swingably engaged to the barrier frame.

* * * * *